(12) United States Patent
Curcic et al.

(10) Patent No.: US 10,759,657 B2
(45) Date of Patent: Sep. 1, 2020

(54) METHOD FOR PROTECTING A MEMS UNIT AGAINST INFRARED INVESTIGATIONS AND MEMS UNIT

(71) Applicant: Robert Bosch GmbH, Stuttgart (DE)

(72) Inventors: Michael Curcic, Stuttgart (DE); Oliver Willers, Korb (DE); Sven Zinober, Friolzheim (DE); Ulrich Kunz, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 72 days.

(21) Appl. No.: 15/936,038

(22) Filed: Mar. 26, 2018

(65) Prior Publication Data
US 2018/0299589 A1    Oct. 18, 2018

(30) Foreign Application Priority Data
Apr. 13, 2017   (DE) .................. 10 2017 206 388

(51) Int. Cl.
| | |
|---|---|
| *B81B 7/00* | (2006.01) |
| *G02B 1/14* | (2015.01) |
| *B81C 1/00* | (2006.01) |
| *H04L 9/08* | (2006.01) |

(52) U.S. Cl.
CPC ........ *B81B 7/0012* (2013.01); *B81C 1/00277* (2013.01); *B81C 1/00317* (2013.01); *G02B 1/14* (2015.01); *H04L 9/0866* (2013.01); *H04L 2209/805* (2013.01)

(58) Field of Classification Search
CPC ............. B81B 7/0012; B81C 1/00277; B81C 1/00317; G02B 1/14; H04L 2209/805; H04L 9/002; H04L 9/0866
See application file for complete search history.

(56) References Cited

U.S. PATENT DOCUMENTS

| | | | | |
|---|---|---|---|---|
| 6,551,853 | B2* | 4/2003 | Toyoda ................... | H01L 29/84 257/E29.324 |
| 7,435,964 | B2* | 10/2008 | Lane ......................... | G01J 1/04 250/338.1 |
| 7,692,148 | B2* | 4/2010 | Lane ......................... | G01J 1/04 250/338.1 |
| 7,718,967 | B2* | 5/2010 | Lane ......................... | G01J 1/04 250/338.1 |
| 7,723,901 | B2* | 5/2010 | Inaguma ............... | B81B 3/0067 310/330 |
| 7,795,723 | B2* | 9/2010 | Chau ..................... | B81B 7/0041 257/704 |
| 7,807,972 | B2* | 10/2010 | Lambkin ................... | G01J 1/04 250/338.1 |
| 8,487,260 | B2* | 7/2013 | Lane ................... | H01L 31/0203 250/339.01 |
| 8,772,718 | B2* | 7/2014 | Ouvrier-Buffet ......... | G01J 5/04 250/338.1 |
| 9,478,682 | B2* | 10/2016 | Kirihara .................... | G01J 5/04 |
| 10,002,896 | B2* | 6/2018 | Reinert ............. | H01L 27/14618 |

(Continued)

*Primary Examiner* — Bao-Luan Q Le
(74) *Attorney, Agent, or Firm* — Norton Rose Fulbright US LLP; Gerard Messina

(57) ABSTRACT

A method is provided for protecting a MEMS unit against infrared investigations, at least one layer being built into the structure of the MEMS unit or at least one layer being applied on a surface of the MEMS unit. The at least one layer absorbs, reflects or diffusely scatters more than 50%, in particular more than 90% of an infrared light incident upon it.

13 Claims, 1 Drawing Sheet

(56) References Cited

U.S. PATENT DOCUMENTS

| | | | |
|---|---|---|---|
| 10,168,220 B2* | 1/2019 | Sun | H04N 5/33 |
| 2005/0205959 A1* | 9/2005 | Chau | B81B 7/0041 |
| | | | 257/467 |
| 2006/0202591 A1* | 9/2006 | Inaguma | B81B 3/0067 |
| | | | 310/348 |
| 2007/0108388 A1* | 5/2007 | Lane | G01J 5/089 |
| | | | 250/353 |
| 2007/0120060 A1* | 5/2007 | Lane | G01J 5/0803 |
| | | | 250/353 |
| 2007/0138394 A1* | 6/2007 | Lane | G01J 5/024 |
| | | | 250/353 |
| 2007/0138395 A1* | 6/2007 | Lane | G01J 5/24 |
| | | | 250/353 |
| 2008/0202209 A1* | 8/2008 | Lambkin | G01J 1/04 |
| | | | 73/31.05 |
| 2012/0097415 A1* | 4/2012 | Reinert | H01L 27/14618 |
| | | | 174/50 |
| 2012/0097853 A1* | 4/2012 | Ouvrier-Buffet | G01J 5/0285 |
| | | | 250/349 |
| 2013/0093037 A1* | 4/2013 | Kirihara | G01J 5/04 |
| | | | 257/435 |
| 2015/0200775 A1 | 7/2015 | Guajardo Merchan et al. | |
| 2016/0282187 A1* | 9/2016 | Sun | H04N 5/33 |

* cited by examiner

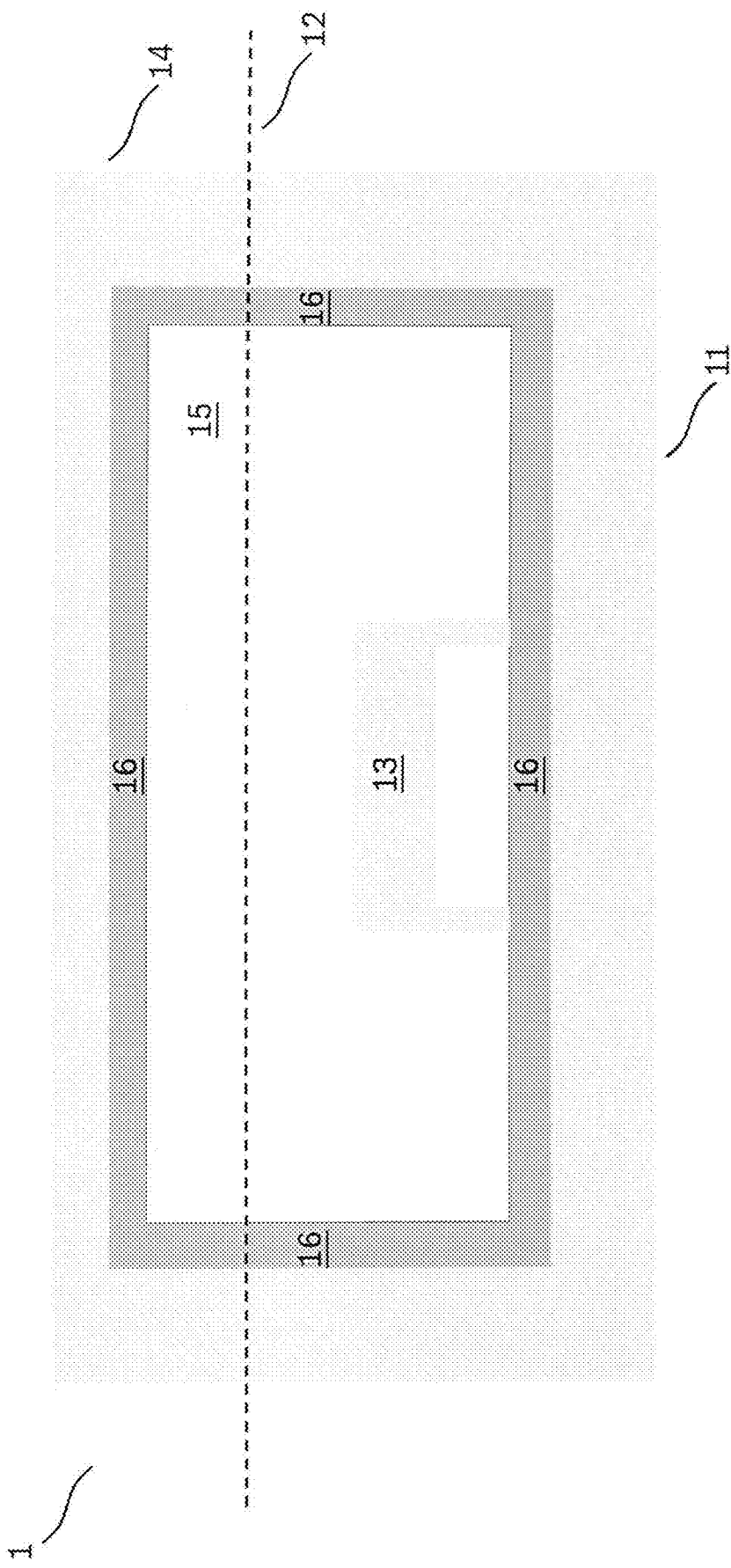

METHOD FOR PROTECTING A MEMS UNIT AGAINST INFRARED INVESTIGATIONS AND MEMS UNIT

CROSS REFERENCE

The present application claims the benefit under 35 U.S.C. § 119 of German Patent Application No. DE 102017206388.2 filed on Apr. 13, 2017, which is expressly incorporated herein by reference in its entirety.

FIELD

The present invention relates to methods for protecting a MEMS unit, in particular a MEMS sensor, against infrared investigations as well as to a MEMS unit and MEMS sensor for this purpose.

BACKGROUND INFORMATION

Microsystems (microelectromechanical systems, MEMS) have made strong gains in importance in recent years. MEMS sensors such as, e.g., MEMS-based inertial sensors are used in countless electronic devices and systems.

The use of secret keys that cannot be read out or copied are the basis for data security in the networked world. These keys are used, e.g., for encrypting data transmissions or also for authenticating network subscribers. After initially pure software keys were used and are still used in non-volatile memories, possibly in especially protected memory areas, the trend is clearly in the direction of hardware-based keys. The currently most prevalent method is the so-called SRAM-PUF (physical unclonable function) in which manufacturing tolerances in transistors result in a random, but repeatable switched state of memory cells after the operating voltage has been applied. SRAM-PUFs, however, have already been read out as well as copied, albeit with considerable effort.

U.S. Patent Application Publication No. 2015/200775A describes the use of MEMS sensors for hardware-based keys. For this purpose, the most varied and unique manufacturing-based electromechanical properties of these sensors such as, e.g., resonant frequencies (modes), capacitances, internal auxiliary signals are captured by an evaluation circuit and combined to form a key. Invasive methods, i.e., opening the sensors, normally result in the destruction of the key since, e.g., die pressure conditions in the interior of the sensor and the mechanical stresses in the sensor change.

Using currently emerging modern infrared measuring methods such as IR vibrometry or IR interferometry, there is the risk that parts of the key may be read out in a non-invasive manner through the silicon that is transparent for IR light, which reduces the security of the key markedly.

SUMMARY

Methods are provided, by which a MEMS unit, in particular a MEMS sensor, is protected against infrared spectroscopic investigations in that these are prevented or at least rendered more difficult. For this purpose at least one layer is incorporated into the structure of the MEMS unit or at least one layer is applied on a surface of the MEMS unit, which, on account of its optical properties, absorbs, reflects or diffusely scatters at least 50%, in particular at least 90% of an infrared light incident or irradiated upon it. Non-invasive investigations of internal physical properties by infrared investigation are thereby prevented or rendered more difficult and in particular the security of secrets or keys derived from the properties is ensured or improved.

The main points of approach in this respect are to make the system nontransparent for IR light or to minimize the transmission and/or optical sharpness to such an extent that reading out or analyzing the structure information required for an ascertainment is no longer possible or is no longer readily possible.

The protection is particularly high if the at least one layer has such structural properties (in particular layer thickness) and optical properties (in particular material properties) that infrared light striking from any incident angle onto the at least one layer is absorbed, reflected or diffusely scattered by the at least one layer at at least 50%, in particular at at least at 90%.

In order to continue to protect the unit or sensor particularly well, in a preferred embodiment, the at least one layer is situated in the unit or in the sensor in such a way that light from any direction passes through the at least one layer between a surface of the MEMS unit or MEMS sensor and the cavity.

MEMS units protected in this way are in particular sensors having a base structure, a sensor cap, an evacuated cavity bounded by the base structure and the sensor cap, and a functional sensor structure applied on the base structure.

In particularly preferred developments, the at least one layer is incorporated in a production of the unit or of the sensor or is applied onto inner surfaces facing the cavity. As a result, it is impossible to remove the layers without invasive intervention into the unit or the sensor and without great effort.

In alternative preferred developments, the at least one layer is applied on an outer surface of the unit or sensor after the latter has been produced. To be sure, a protection against removal of the layer is in this case often reduced. Nevertheless, here too a removal is laborious and possibly results in damage to the unit or to the sensor. Furthermore, in these developments, the layer is easier to apply.

Due to their optical properties, metallic plies are particularly suitable for the development of the at least one layer. It is also possible to use an additional wafer as the further layer, e.g. by bonding methods such as are also used, e.g., in the production of sensors.

BRIEF DESCRIPTION OF THE DRAWING

The present invention is explained below in greater detail with reference to the appended drawing and on the basis of exemplary embodiments.

FIG. 1 schematically shows an exemplary MEMS sensor.

DETAILED DESCRIPTION OF EXAMPLE EMBODIMENTS

In measurements using laser IR vibrometry on MEMS sensors, transmission values for infrared frequencies were ascertained in the range of typically approx. 50%. With such measurements, it is possible to determine frequencies in the sensor structure and thus to make inferences regarding the physical properties of the MEMS sensor on which a PUF is based and thus inferences regarding the PUF. The present invention relates to securing MEMS sensors against an investigation using infrared spectroscopy. Aside from MEMS sensors it is also possible to use MEMS units, whose proper functional MEMS structure is optimized in such a way for PUF functionality that the MEMS unit is no longer able to perform any (significant) sensor functions, but serves primarily as a PUF unit. Such MEMS units are also to be protected against infrared investigations.

FIG. 1 shows a MEMS sensor 1. MEMS sensor 1 has a base wafer 11, whose delimitation vis-a-vis the other layers 14 is shown by separating line 12. MEMS sensor 1 has additional layers 14, which together with base wafer 11 enclose a cavity 15. Layers 14 may be connected to layers 11 by a bonding method. Layers 14 are also referred to as a so-called sensor cap. A vacuum is preferably produced in cavity 15. The actual functional sensor structure 13 of MEMS sensor 1 is situated in cavity 15 and on base wafer 11.

While layers 11 and layers 14 as well as sensor structure 13 are usually made up of silicon, the MEMS sensor in FIG. 1 has a metallic layer 16 or metallic plies 16, which is/are situated on the inner surface of layers 11 and 14, that is, the surface facing cavity 15. This metallic layer prevents or renders more difficult an investigation of the MEMS sensor using infrared-spectroscopic methods since they are (largely) non-transparent for infrared frequencies and therefore sufficient transmission values for a spectroscopic investigation are not achieved. The layer thickness and the material used should be selected in such a way that at least 50% of the IR light irradiated upon the layer is absorbed, reflected or diffusely scattered, in particular at least 90%. Due to the location in the interior of the MEMS sensor 1, a removal of layers 16 by an attacker of the PUF is hardly possible since this would massively damage sensor 1 as well as destroy the vacuum of cavity 15. Such an intervention into the sensor structure may also have the consequence that impressed mechanical states of stress (e.g., from the molding process) or pressure ratios change and that as a result the physical properties or the precise expression of the sensor properties, on which the PUF is based, change slightly. The security against manipulation is thus greatly increased. For these reasons, in an alternative development having an inserted, that is, buried layer, it is also preferred that this layer is inserted near the surface facing the cavity.

In alternative developments, the at least one layer having appropriate optical properties may as be inserted (in particular buried) or applied in other locations of the MEMS sensor as well. Thus, e.g., metallic layers on the outer surface of the MEMS sensor may also be suitable. Here, a protection against a removal of the layers is no longer quite as high as in the previously described exemplary embodiment. However, grinding down the layers continues to be laborious and may damage MEMS sensor 1 so that an attack on the PUF of the MEMS sensor is at least rendered much more difficult.

Alternatively, it may already suffice to provide the at least one layer only in or on the base wafer or only in or on the sensor cap.

Apart from metallic layers, fundamentally other layers having the mentioned optical properties are also suitable. The layers may be applied in a variety of ways. Apart from deposition or ablation methods, layers may also be applied by bonding. Thus it is possible for example to use bonding methods to apply at least one additional wafer on a surface of the other wafer layers.

What is claimed is:

1. A method for protecting a MEMS unit against infrared investigations, the method comprising:
  one of: (i) building at least one layer into a structure of the MEMS unit as a buried layer of the MEMS unit, or (ii) applying the at least one layer onto an inner surface of the MEMS unit facing a cavity of the MEMS unit; and reflecting more than 50% of an infrared light incident on the at least one layer, or diffusely scattering more than 50% of the infrared light incident on the at least one layer;
  wherein the at least one layer includes a metallic layer;
  wherein the MEMS unit includes a base wafer, a sensor structure, the cavity, and a sensor cap, the cavity being formed in the base wafer and the sensor cap completely covering the cavity, the sensor cap together with the base wafer completely enclosing the cavity, the sensor structure being situated in the cavity on the base wafer;
  wherein the MEMS unit is a MEMS sensor;
  wherein the metallic layer completely surrounds the sensor structure; and
  wherein the metallic layer is applied to and continuously covers all inside surfaces of the cavity facing the sensor structure.

2. The method as recited in claim 1, wherein the metallic layer reflects or diffusely scatters more than 90% of the infrared light incident upon the at least one layer.

3. The method as recited in claim 1, wherein the at least one layer is built in or applied during production of the MEMS unit.

4. The method as recited in claim 1, wherein infrared light striking the at least one layer from any angle of incidence is reflected or diffusely scattered by the at least one layer at at least 50%.

5. The method as recited in claim 1, wherein the metallic layer includes a plurality of plies.

6. The method as recited in claim 1, wherein a vacuum is formed in the cavity.

7. A MEMS unit, including at least one of a built-in or an applied layer, the layer reflects more than 50% of an irradiated infrared light or diffusely scatters more than 50% of the irradiated infrared light, wherein the layer is built in the MEMS unit as a buried layer or the layer in on an inside surface of the MEMS unit facing a cavity of the MEMS unit, wherein the layer is a metallic layer;
  wherein the MEMS unit includes a base wafer, a sensor structure, the cavity, and a sensor cap, the cavity being formed in the base wafer and the sensor cap completely covering the cavity, the sensor cap together with the base wafer completely enclosing the cavity, the sensor structure being situated in the cavity on the base wafer;
  wherein the MEMS unit is a MEMS sensor;
  wherein the metallic layer completely surrounds the sensor structure; and
  wherein the metallic layer is applied to and continuously covers all inside surfaces of the cavity facing the sensor structure.

8. The MEMS unit as recited in claim 7, wherein the metallic layer is situated in such a way that light from any direction passes through the metallic layer between a surface of the MEMS unit and the cavity.

9. The MEMS unit as recited in claim 7, wherein the metallic layer reflects or diffusely scatters more than 90% of the irradiated infrared light.

10. The MEMS unit as recited in claim 7, wherein the metallic layer includes a plurality of plies.

11. The MEMS unit as recited in claim 7, wherein a vacuum is in the cavity.

12. A MEMS unit, including at least one of a built-in or an applied layer, the layer reflects more than 50% of an irradiated infrared light or diffusely scatters more than 50% of the irradiated infrared light, wherein the layer is built in the MEMS unit as a buried layer or the layer in on an inside surface of the MEMS unit facing a cavity of the MEMS unit, wherein the layer is a metallic layer;

wherein the MEMS unit includes a base wafer, a sensor structure, the cavity, and a sensor cap, the cavity being formed in the base wafer and the sensor cap completely covering the cavity, the sensor cap together with the base wafer completely enclosing the cavity, the sensor structure being situated in the cavity on the base wafer;

wherein the MEMS unit is a MEMS sensor;

wherein the metallic layer completely surrounds the sensor structure; and wherein the metallic layer is built into the structure of the MEMS unit as the buried layer of the MEMS unit, the buried layer being buried within the sensor cap and within the base wafer.

13. A method for protecting a MEMS unit against infrared investigations, the method comprising:

one of: (i) building at least one layer into a structure of the MEMS unit as a buried layer of the MEMS unit, or (ii) applying the at least one layer onto an inner surface of the MEMS unit facing a cavity of the MEMS unit and reflecting more than 50% of an infrared light incident on the at least one layer, or diffusely scattering more than 50% of the infrared light incident on the at least one layer;

wherein the at least one layer includes a metallic layer;

wherein the MEMS unit includes a base wafer, a sensor structure, the cavity, and a sensor cap, the cavity being formed in the base wafer and the sensor cap completely covering the cavity, the sensor cap together with the base wafer completely enclosing the cavity, the sensor structure being situated in the cavity on the base wafer;

wherein the MEMS unit is a MEMS sensor;

wherein the metallic layer completely surrounds the sensor structure; and wherein the metallic layer is built into the structure of the MEMS unit as the buried layer of the MEMS unit, the buried layer being buried within the sensor cap and within the base wafer.

\* \* \* \* \*